United States Patent [19]

Engelmann

[11] 4,279,852

[45] Jul. 21, 1981

[54] INDICIA PRODUCING METHOD

[76] Inventor: Rudolph H. Engelmann, Box 687, Willmar, Minn. 56201

[21] Appl. No.: 127,917

[22] Filed: Mar. 6, 1980

[51] Int. Cl.³ .............................................. B29C 1/02

[52] U.S. Cl. .................................... 264/227; 264/220; 264/225; 264/226; 264/293; 264/299; 264/338

[58] Field of Search ............... 264/219, 220, 221, 225, 264/226, 227, 293, 299, 338; 101/17

[56] References Cited

U.S. PATENT DOCUMENTS

| | | | |
|---|---|---|---|
| 2,022,183 | 11/1935 | Browne | 264/219 |
| 3,101,668 | 8/1963 | Leeds | 264/226 |
| 3,456,586 | 7/1969 | Andnes | 264/225 |
| 4,198,364 | 4/1980 | Laurie | 264/227 |

FOREIGN PATENT DOCUMENTS

| | | | |
|---|---|---|---|
| 940748 | 10/1963 | United Kingdom | 264/227 |

*Primary Examiner*—James B. Lowe

*Attorney, Agent, or Firm*—Kinney, Lange, Braddock, Westman and Fairbairn

[57] ABSTRACT

A method of producing an indicia transferring surface including affixing an inert material in the shape of indicia to a base sheet containing a curing inhibitor coating. A curable compound is placed on the surface of the base sheet in contact with the indicia shaped inert material and is allowed to cure. After a curing period, the curable compound is separated from the base sheet. The curable compound includes a cured portion and an uncured portion. The uncured portion is removed, leaving raised areas of the cured compound that were in contact with the indicia shaped inert material. The raised areas may then be used to transfer the impression of the indicia to another surface.

8 Claims, 5 Drawing Figures

INDICIA PRODUCING METHOD

BACKGROUND OF THE INVENTION

1. Field of the Invention

The present invention relates to methods of transferring indicia from one surface to another, and in particular, the present invention relates to an economical method of producing an indicia transferring surface. Also disclosed is a method of producing surfaces having raised areas in the form of said indicia.

2. Description of the Prior Art

In the prior art, there are many methods of transferring indicia from one surface to another. Three basic methods are lithographic printing, gravure printing, and letter press printing.

In lithographic printing, the transferring surface or the printing gate has a light-sensitive coating on its surface. Portions of the coating which have been subjected to light are washed away by a selective solvent. The coating that is left on the lithographic plate is in the form of indicia and attracts ink, the ink having been transferred to the plate from another surface. The ink is then transferred from the lithographic plate to the desired surface. As is readily seen from the above description, the lithographic process involves a substantial amount of equipment and considerable cost.

In the gravure printing process, the indicia transferring surface or the printing plate uses recessed areas to transfer the desired indicia to another surface. The recessed areas are formed by various engraving processes most of which require substantial cost and equipment.

The letter press process relies on raised areas to transfer ink from the transferring surface or plate to printing surface. The raised areas or type face are usually molded and then placed next to each other on the transferring surface or plate to form the desired indicia for transferring. This method, like the first two printing methods, also involves considerable cost and requires a substantial amount of equipment for transferring indicia from one surface to another.

Other methods of transferring indicia from one surface to another include engraving, etching and embossing. Engraving, generally involves the formation of grooves in a flat surface with a tool, the grooves being the shape of the indicia desired for transferring.

Etching involves coating a metal surface with an acid-resistant coating and scratching the coating in the form of indicia, then contacting the surface with an acid, the acid eating into the metal surface and leaving the impression of the indicia to be transferred to another surface.

Embossing is a process that merely stamps the desired impression or indicia into a thin flat plate made of plastic or metal, raising the surface on the other side, the raised surfaces being used to transfer the desired indicia to another surface.

Engraving and etching involve a considerable amount of craftsmanship and embossing generally involves an embossing machine or a chisel-type tool. Engraving, etching and embossing are slow processes and embossing is limited to transferring surfaces having fairly thin thicknesses.

There are many applications wherein the above-mentioned methods are not suitable for transferring indicia either because of economic costs or physical limitations of the method itself. One such example is the marking of electrical components for identification purposes. Using any of the three above-mentioned printing processes for identification marking of electric components would be very costly because of the equipment needed to transfer indicia to the surface of the electrical component. Engraving, etching or embossing an identification marking into an electrical component are too slow to be economically efficient. What is needed is a method of producing an indicia transferring surface that does not require a substantial amount of equipment or craftsmanship, and yet is economically efficient.

SUMMARY OF THE INVENTION

The present invention is a method of producing an indicia transferring surface and transferring the indicia to another surface. The method includes affixing an inert material in the shape of the desired indicia to a base sheet coated with a curing inhibitor coating. The inhibitor is covered or inoperative in the area defined by the inert material. A thickness of a curable compound is then placed on the base sheet over the layers just described and allowed to cure in contact with the indicia shaped inert material. The base sheet is then separated from the curable compound leaving a cured portion that was in direct contact with the inert material and an uncured portion that was in direct contact with the curing inhibitor coating. The uncured portion of the curable compound is then removed exposing raised areas of the cured portion of the curable compound in the shape of indicia which are used as the transferring surface.

DETAILED DESCRIPTION OF THE PREFERRED EMBODIMENTS

Figure 1:
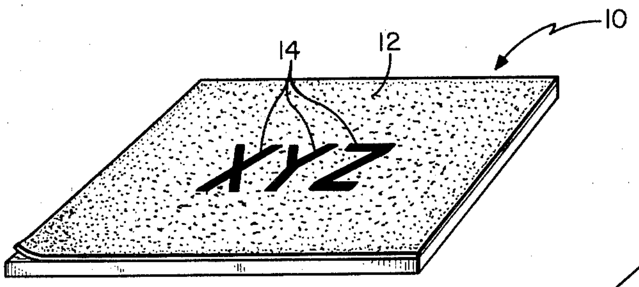
FIG. 1 is a perspective view of the base sheet with a curing inhibitor coating and the inert material in the shape of indicia.

FIG. 1 shows the base sheet generally indicated at 10 with a cure inhibiting coating 12 and an inert material 14 in the shape of indicia being affixed to the cure inhibiting coating 12. The base sheet 10 as shown in FIG. 1 is flat, but it may be of any contour and may be a surface of a prototype used to cast a mold which will be used in turn to cast replicas of the prototype.

Figure 2:
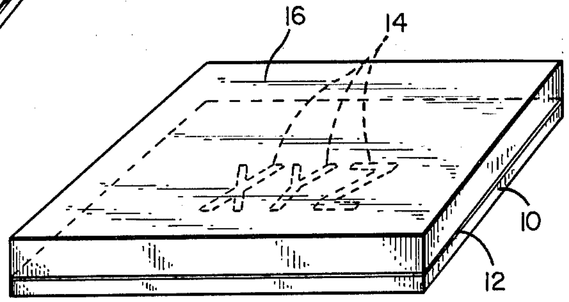
FIG. 2 is a perspective view of a layer of the curable compound being placed on the base sheet.

FIG. 2 shows a first curable compound 16 in contact with the base sheet 10 having the cure inhibiting coating 12 and the inert material 14 in the shape of indicia. The first curable compound 16 is allowed to cure while being in contact with the base sheet 10. One such curable compound used in applying the method of the present invention is an RTV (room temperature volcanizing) silicon rubber made by the General Electric Company and is of the family of polydimethyl siloxanes. The RTV silicon rubber is a viscous liquid in the uncured state and when cured turns into a firm rubber solid. All that is required of the curable compound is that it cure at a temperature and rate which is sufficiently controllable that permits ready inhibition of the curing step by the contact with cure inhibiting compounds. Of course, the curable compound should be capable of being cured to a useful hard final product, like the RTV silicon rubber.

The cure inhibiting coating 12 on the base sheet 10 should be a cure inhibiting substance that inhibits the curing of the first curable compound 16. In the case of the RTV silicon rubber there are several cure inhibitors such as vinyl plastics, synthetic and natural rubbers, sulfur containing materials such as polysulfides, tin soaps, certain epoxies containing strong ammine catalysts, clays, woods, leathers, tape adhesives, and heat cured rubbers and chlorinated substances such as neoprene. In one example of the present invention, ordinary masking tape was used as the base 10, and the tape adhesive as the cure inhibiting coating 12. The tape adhesive inhibited the curing of approximately 10 mils of the curable compound directly adjacent and in contact with the tape adhesive. Normally any material which inhibits, poisons or interrupts the crosslinking process in curing is a suitable coating 12. The inert material 14 which is in the shape of the indicia is any material that stops the cure inhibiting characteristics of the cure inhibiting coating 12. By definition this inert material does not interfere with the crosslinking of the curable compound. One example of such a material is the dry transfer letters produced by Datak Corporation employing dry ink which is transferred by pressure. The transfer letters are in direct contact with the first curable compound 16 between the cure inhibiting coating 12 and the first curable compound 16. Thus the adhesive 12 cannot disrupt the curing of the polymer 16. The inert material of the transfer letters allows or really does not prevent portions of the first curable compound 16 which are directly in contact with the transfer letters to cure while the rest of the area, in contact with the cure inhibiting coating are poisoned or inhibited and will not cure. In one preferred embodiment of the present invention, the tranfer letters were attached directly to the adhesive side of the masking tape and the first curable compound placed on the adhesive side and allowed to cure.

Figure 3:
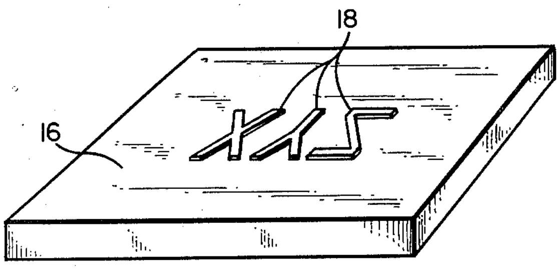
FIG. 3 is a perspective view of the curable compound after the cured and uncured portions having been removed showing the resulting mirror image of the indicia.

The result of employing the method of the present invention wherein one part of the first curable compound 16 cures while another area does not is shown in FIG. 3. FIG. 3 shows the section of the first curable compound 16 of FIG. 2 reversed or inverted with the bottom portion in FIG. 2 now being the top portion in FIG. 3. To produce the raised areas 18, the uncured portion is removed. The removal is simply done by washing the surface of the first curable compound 16 with a solvent for the uncured portion. For RTV silicon rubber an appropriate solvent would comprise a zinc chloride solution, preferably in a hydrocarbon solvent. After using the solvent containing zinc chloride, the surface may be further cleaned by scrubbing with trichloroethylene saturating a soft brush or cloth. The result, as mentioned previously, is the raised indicia 18 in the mirror image form found in FIG. 3.

Figure 4:
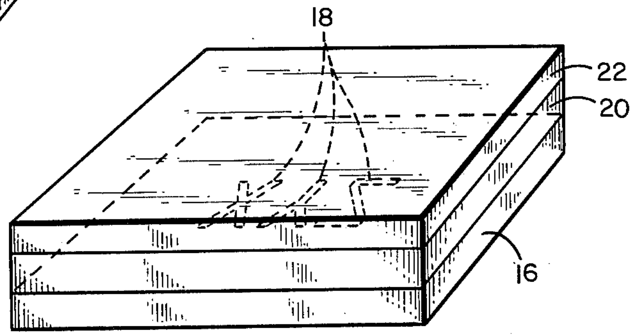
FIG. 4 is a perspective view of a second curable compound being placed on the first cured compound for the purpose of transferring indicia.
Figure 5:
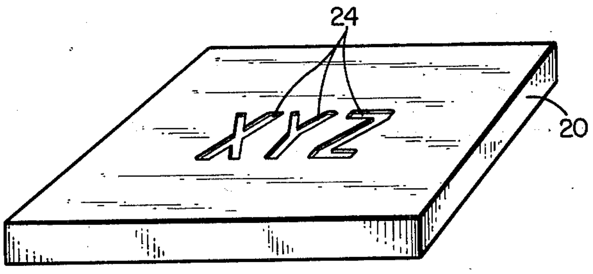
FIG. 5 is a perspective view of the second curable compound now cured displaying the impression left by the first cured compound's raised indicia.

The method of transferring the impression of the indicia 18 to a product to be marked with such indicia is shown in FIG. 4. A second curable compound 20 is placed on top of the first curable compound which is now cured and will be referred to as the first cured compound. A pressure plate 22 ensures proper contact between the second curable compound 20 and the first cured compound. The curable compound 20 is allowed to cure and the pressure plate 22 is removed. The first cured curable compound 16 and the now cured second curable compound 20 are separated to produce the engraving or impression of the indicia 24 in the second curable compound as shown in FIG. 5. Of course injection molding processes and other casting methods may be used to form the second cured compound. Both thermoplastic and thermosetting resins may be used in their conventional manner.

The second curable compound 20 represents the product to which the impression of the indicia is to be transferred. Although the second compound 20 is shown as a flat plate it may be of any shape or form. In one example using the method of the present invention a mold was formed using the RTV silicon rubber as the first curable compound 16 forming the mold. Masking tape and its adhesive were used as elements 10 and 12. Datak Corporation dry transfer letters were used as inert material 14. The mold was used to cast protective casings for electrical components. On one of the inner surfaces of the mold of the RTV silicon rubber were located the raised areas of the indicia, being made as previously discussed above. The electrical component was placed inside the mold and an epoxy resin for the second curable compound was poured into the mold and cured. Upon curing, the rubber mold was twisted open and the electrical component removed with the identification marking transferred by molding into the epoxy protective covering. As is readily seen, in using the method of the present invention a product can be made and marked with identification type indicia in one step, eliminating the second step of identifying the product by one of the traditional methods of the prior art.

The second curable compound may, by way of example, be any crosslinking polymer suitable for any known molding process. Such crosslinking polymers include phenolics, phenyl resins produced either by the condensation of urea or melamine with formaldehyde, urethane foams, and any of the alkyd resins suitable for molding.

Although the present invention has been described with reference to the preferred embodiment persons skilled in the art will recognize that changes may be made in form and detail without departing from the spirit and scope of the invention.

What is claimed is:

1. A method of producing an indicia transferring surface comprising:

providing a base with a surface having a curing inhibitor coating thereon;

affixing an inert material in the shape of indicia to the curing inhibitor coating;

placing a first curable compound in direct contact with the curing inhibitor coating and the inert material in the shape of indicia;

allowing the first curable compound to cure;

separating the base from the first curable compound; and removing the uncured layer of the first curable compound thereby exposing cured raised areas of the first curable compound that were in contact with the indicia shaped inert material.

2. The method of claim 1 and further comprising:

placing a second curable compound in direct contact with the raised surfaces of the now cured first curable compound;

allowing the second curable compound to cure in contact with the now cured first curable compound; and separating the second curable compound now cured from the first cured curable compound whereby the second curable compound contains the impression of the raised areas of the first cured curable compound.

3. The method of claim 1 wherein the first curable compound is a polydimethylsiloxane.

4. The method of claim 2 wherein the second curable compound is an epoxy polymer.

5. The method of claim 1 wherein the cure inhibitor coating is the adhesive of standard masking tape.

6. The method of claim 2 wherein the first curable compound is formed in the shape of a mold with the raised surfaces within the mold's interior, said mold being used to contain the second curable compound and defining the bounds of the product being molded whereby the second curable compound has been cured, the impression of the indicia is transferred to the molded product in one step.

7. A method of producing an indicia transferring surface comprising:

providing a base having a curing inhibitor coating portion and an inert material portion on a surface thereof for defining indicia;

placing a first curable compound in direct contact with the curing inhibitor coating portion and the inert material portion;

allowing the first curable compound to cure;

separating the base from the first curable compound; and removing an uncured layer of the first curable compound formed by contact of the first curable compound with the curing inhibitor coating portion to expose cured raised areas of the first curable compound that were in contact with the inert material portion.

8. The method of claim 7 and further comprising:

placing a second curable compound in direct contact with the raised surfaces of the now cured first curable compound;

allowing the second curable compound to cure in contact with the now cured first curable compound; and separating the second curable compound now cured from the first cured curable compound whereby the second curable compound contains the impression of the raised areas of the first cured curable compound.

* * * * *